March 17, 1925.
H. ADELMANN
CORNED BEEF STRIP COOKER
Filed June 16, 1924
1,529,825
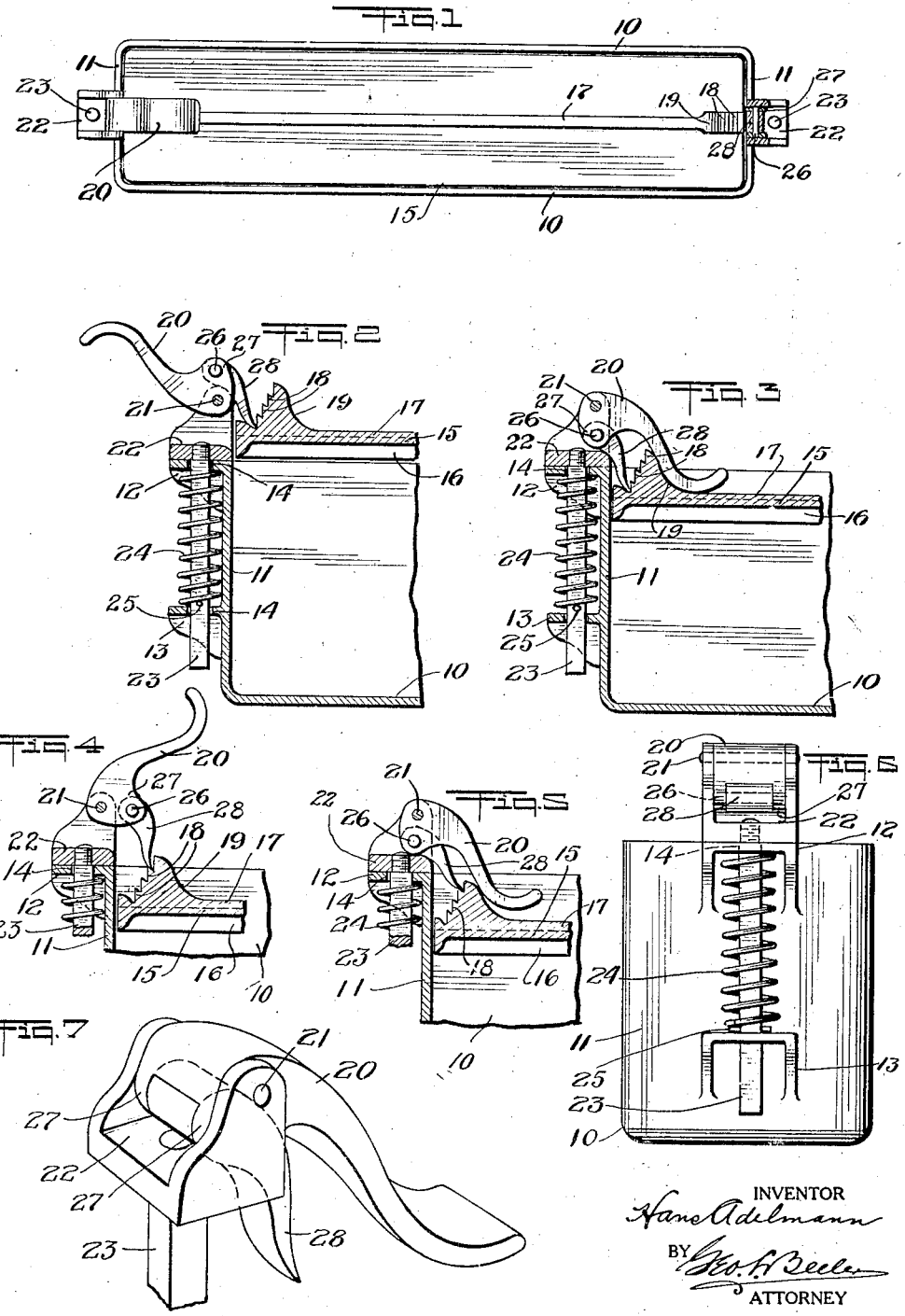
INVENTOR
Hans Adelmann
BY Geo. H. Beeler
ATTORNEY Patented Mar. 17, 1925.

1,529,825

UNITED STATES PATENT OFFICE.

HANS ADELMANN, OF NEW YORK, N. Y., ASSIGNOR TO HAM BOILER CORPORATION, OF NEW YORK, N. Y., A CORPORATION OF NEW YORK.

CORNED-BEEF-STRIP COOKER.

Application filed June 16, 1924. Serial No. 720,407.

*To all whom it may concern:*

Be it known that I, HANS ADELMANN, a citizen of the United States, residing at New York city, borough of the Bronx, in the county of Bronx and State of New York, have invented certain new and useful Improvements in Corned-Beef-Strip Cookers, of which the following is a specification.

This invention relates to meat cookers or the like and has particular reference to that type of appliances used extensively for the cooking and shaping of meats such as corned beef, hams, or the like, the same being cooked while under a considerable amount of pressure.

Among the objects of the invention is to provide a specially shaped receptacle adapted for long pieces or strips of meat and with specially constructed means for applying pressure to the contents of the receptacle preparatory to cooking.

More specifically, I provide a cover for the receptacle and fastening means in the nature of power levers having the double function of putting the cover under sufficient compression and for locking the same under pressure irrespective of the thickness or depth of the material within the receptacle, it being remembered that in devices of this kind the contents of the receptacle may vary greatly in size or depth, and yet a suitable or required degree of compression must be established for the purpose of properly molding or shaping the contents while cooking.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view showing my improvement.

Fig. 2 is a vertical sectional detail showing the relation of the power and locking devices to the other parts when the cover is applied over a completely filled receptacle.

Fig. 3 is a view similar to Fig. 2 but showing the depression of the cover when the levers are swung inward and downward from the position of Fig. 2.

Figs. 4 and 5 are views corresponding to Figs. 2 and 3 respectively, but showing the application of the power device for deeper compression of the cover.

Fig. 6 is an end elevation with the parts arranged substantially as in Fig. 3.

Fig. 7 is a perspective view of the power and locking devices.

Referring now more specifically to the drawings I show at 10 a boiler or receptacle of substantially rectangular form and designed particularly for the cooking of meats or the like in long pieces or strips and for molding the same in a form best suited for the making of sandwiches. This receptacle has end walls 11, each of which carries on its outer surface a pair of vertically aligned brackets 12 and 13 having square holes 14 formed in their upper portions. These brackets may be formed on or secured to the ends 11 of the receptacle in any suitable manner as by casting, drop forging, or otherwise. The upper bracket 12 lies substantially flush with the top of the receptacle.

The cover 15 is shaped to fit slidably within the receptacle and preferably is provided with a downwardly projecting marginal flange 16. Along the center of the upper surface is formed a rib 17 at the ends of which are formed upstanding sets of teeth 18, each set being more nearly vertical than horizontal, and just within or adjacent to each set of teeth the body of the rib constitutes a stop member at 19. The rib 17 and the series of teeth lie in substantially the same vertical plane as the brackets 12 and 13 at the ends of the receptacle.

As is customary in this type of device I provide locking means operating between the cover and the receptacle for holding the cover in depressed position while the contents are being cooked and shaped. The locking mechanism, which incidentally serves as power or pressure means, includes a pair of levers 20, in the nature of bell cranks, pivoted permanently at 21 between the upwardly extending parallel lugs of a pair of anchor members 22 with flat bases bearing normally upon the top surface of the brackets 12 and having their inner edges substantially flush with the inner vertical surfaces of the end pieces 11 of the receptacle, and with the axes of the pivots 21 parallel to said inner surfaces. Each anchor member is held in place, especially from rotation on its bracket seat, by means of a bolt 23 shown as rectangular in cross section and fitted slidably in the aligned holes 14 of the brackets. The upper end of the bolt 23 is threaded and fitted tightly into the base of the anchor member. A strong coil spring 24 surrounds the portion of the bolt between the horizontal portions of the brackets, substantially filling such space, and serving normally to hold the anchor member against the upper bracket. A pin 25 extends through the bolt and constitutes a support for the lower end of the spring, whereby the normal tendency of the spring is to maintain the parts in the position shown. The strength of these springs is calculated to be sufficient to afford as much compression as the contents of the receptacle will ever demand, and yet the springs will permit a moderate degree of expansion of the contents while cooking without expressing an undesirable amount of the juices therefrom. The springs, however, are so constructed that at no time will they permit the lower ends of the bolts 23 from passing upward above the lower brackets 13.

Since the levers 20 are in the nature of bell cranks, each is provided with a pivot 26 spanning a pair of ears 27 and with its axis parallel to the pivot 21 but offset from the general length of the lever a distance of say, for example, three-fourths of an inch. Between said ears 27 and hung upon the pivot 26 is a pawl 28, the remote end or point of which is adapted to co-operate selectively with the several teeth 18 on the adjacent end of the cover. By comparison of Figs. 2 to 5, the action of the power and locking devices will be understood. When the receptacle is filled or supplied with material to be cooked, the levers 20 being swung well outward and downward, the cover is put in place, for instance, as shown in Fig. 2, the pawls at such time being thrown outward and upward out of the way of the cover. The pawls and levers are then swung inward so that the points of the pawls will engage with the lowermost teeth and the operator then will force the levers inward or toward each other for the purpose of applying pressure downward upon the cover, the pivots 26 at such time moving inward and downward. The operator will note by experience how much pressure to apply or with which teeth to engage the pawls. If the position of the cover as in Fig. 3 is not low enough according to the contents of the receptacle, he will oscillate the levers one or more times up and down around their pivots, allowing the points of the pawls to engage in succession the notches or teeth 18 until the proper degree of compression is obtained as, for instance, in Figs. 4 and 5. The levers, however, in all cases will eventually be swung far enough downward for the pivots 26 to pass the dead centers between the points of the pawls and the pivots 21 while the handle ends of the levers rest squarely against the stop shoulders 19, making a positive interlock for these several relatively movable parts. Thus the cover in all cases will be positively locked with respect to the anchor members, and while the springs serve normally to hold the cover in the desired compression position, the locking mechanism with the cover as a unit may still move upward against the force of the springs while the cooking is taking place in case there is an incident swelling of the contents of the receptacle. Ordinarily, however, any such swelling of the contents is relieved during the latter portion of the cooking operation and so any compression of the springs due to expansion of the meat will serve to take up automatically the tendency of the meat to shrink during such latter portion of the operation and so the locking devices are maintained in proper fixed position. After the cooking operation is completed the levers are lifted and swung outward for the release of the holding pawls, an operation facilitated by the upward curvature of the free ends of the levers.

Since the free ends of the levers, in set or locked position, bear directly against the stops there can be no tendency for the pawls or thrust members to be given an outward thrust, away from each other, by reason of upward thrust on the cover. Hence the actuating and locking devices at each end of the receptacle will move upward as a unit, against the force of the spring, and by no means can any binding or cramping of the bolt 23 take place in its bracket bearings.

The series of teeth 18 while substantially upright are inclined from the vertical so as to form substantially a right triangle with the plane of the adjacent end wall, the base of such triangle being substantially equal to the eccentricity or offset distance between the pivots 21 and 26, whereby ample clearance for the swing and movement of the actuator pawl is provided for various positions of adjustment of the cover.

I claim:

1. In a corned beef strip cooker, the combination with a receptacle and a cover therefor, said receptacle having end brackets, of combined power pressure and locking means between the brackets and the cover, said power and locking means including a bell crank lever for each end, anchor means to which the lever is pivoted, and a thrust member pivoted to the lever and having direct contact with the adjacent end of the cover.

2. The combination with a corned beef cooker receptacle and a cover co-operating therewith, of locking and pressure means between the receptacle and the cover comprising a pair of levers pivoted upon the ends of the receptacle and outward from the cover, and a pair of pawls pivoted to the levers and whose points have direct contact with the adjacent ends of the cover, the pivots for the pawls being movable around the pivots for the levers so as to make the pawls self locking in holding position.

3. Mechanism as set forth in claim 2 including stop means to limit the swing of the levers around their pivots.

4. A cooker as described comprising, in combination, a receptacle having end brackets with vertical holes, a cover movable downward with respect to the receptacle and having at each end an upright series of teeth, thrust members co-operating with said teeth, anchor means fitted slidably in said bracket holes and to which the thrust members are attached, and means co-operating with each thrust member and its anchor means to compel the anchor member and parts connected thereto to move and act as a unit.

5. The combination with a cooker receptacle, a cover slidable therein, and adjustable locking means for said cover borne upon said receptacle, of a rack mounted upon said cover and engageable with said locking means for adjustable positioning of said cover relatively to said receptacle the teeth whereof face said locking means, said rack being positioned within the planes of the walls of said receptacle and substantially upright.

6. The combination with a cooker receptacle and a cover movable relatively thereto, of locking means between the receptacle and the cover comprising a movable anchor member mounted upon the receptacle, a lever pivoted upon said anchor member, a pawl pivoted upon said lever and actuated thereby for locking engagement with said cover.

7. The combination as in claim 6 wherein a resilient member co-operates with said anchor member to hold the same normally in engagement with the receptacle.

8. The combination with a cooker receptacle and a cover movable relatively thereto, of locking means between the receptacle and the cover comprising a lever pivoted upon said receptacle, a pawl pivoted upon said lever, and a rack upon said cover adjacent to said pawl and engageable therewith in co-operation with said lever to lock the cover down.

9. In a cooker, the combination with a receptacle, and a cover therefor, of adjustable locking means therebetween including a substantially upright rack upon the cover, a lever pivoted upon the receptacle, and a pawl pivoted upon the lever, said pawl being engageable with said rack, said rack being inclined away from said pawl so as to form with the vertical substantially a right triangle whose base is substantially equal to the distance between the aforesaid pivots.

10. The combination with a cooker receptacle part, and a cover part movable relatively thereto, of locking means between the receptacle and the cover comprising a bell crank pivoted upon one of said parts, a pawl pivoted upon said bell crank, and a rack upon the other part engageable with said bell crank to lock the cover down.

11. The combination as in claim 10 wherein said rack is inclined away from said bell crank to form with the vertical a triangle whose base is equal substantially to the distance between the pivots aforesaid.

In testimony whereof I affix my signature.

HANS ADELMANN.